Nov. 1, 1966  S. R. KERESTES  3,281,972
REMOVABLE BLADE
Filed Oct. 23, 1963  2 Sheets-Sheet 1
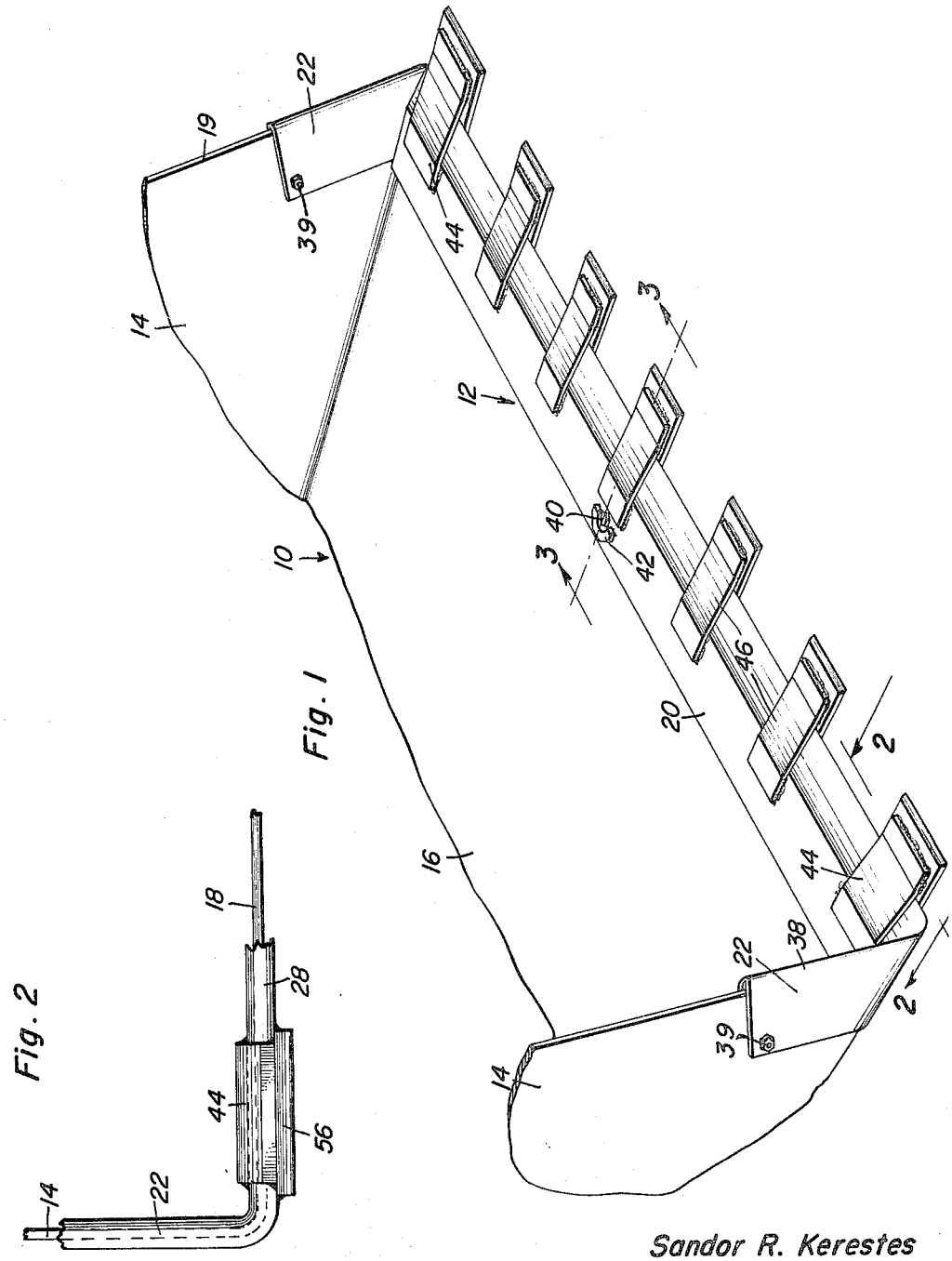
Sandor R. Kerestes
INVENTOR.
BY Clarence A. O'Brien
and Harvey B. Jacobson
Attorneys

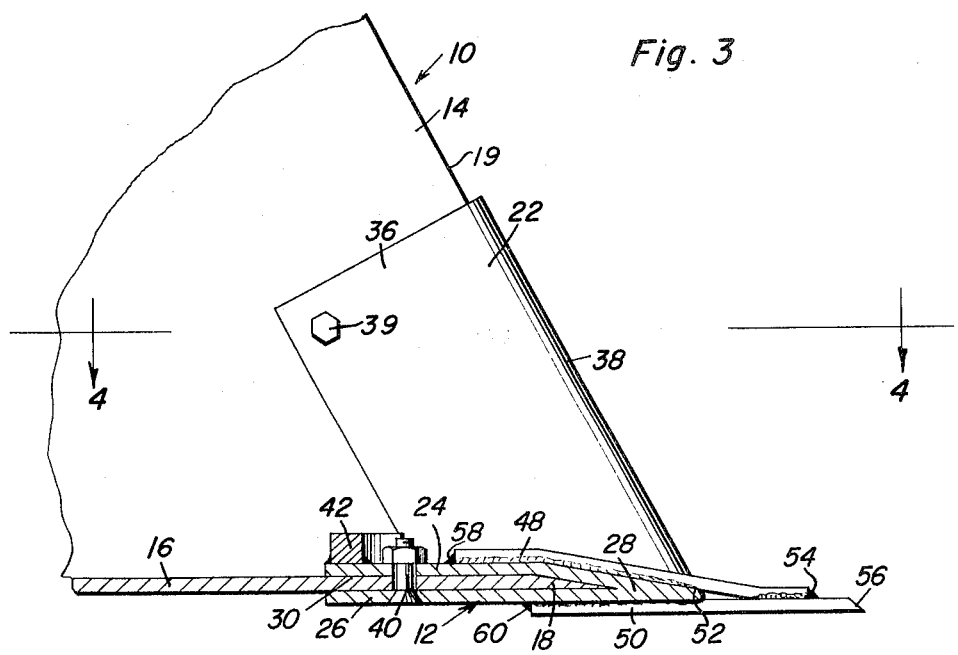
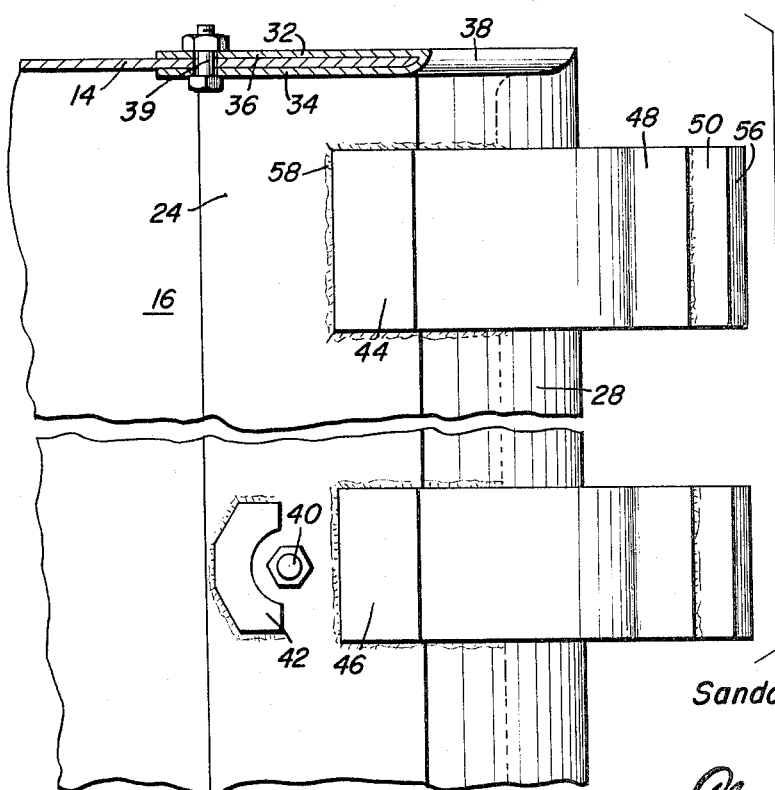

United States Patent Office 3,281,972
Patented Nov. 1, 1966

3,281,972
REMOVABLE BLADE
Sandor R. Kerestes, P.O. Box 64, La Follette, Tenn.
Filed Oct. 23, 1963, Ser. No. 318,433
4 Claims. (Cl. 37—141)

This invention comprises a novel and useful removable blade and more particularly pertains to a toothed replacement blade for the cutting edges of buckets and shovels of the power operated excavating machinery-type.

The forward lips or cutting edges of buckets, shovels or scoops of power-operated excavating machines are subject to unavoidable and exceedingly rapid wear and deterioration, necessitating their frequent sharpening, repairs or replacement. Heretofore, it has been conventional practice to form the cutting edge with individually detachment teeth. In view of the wear occurring upon the exposed tooth fasteners and the number of the teeth on the bucket cutting edge which must be changed or replaced, it is a rather laborious and time-consuming job to replace or recondition the teeth for further use.

It is therefore the primary object of this invention to provide a means satisfactorily overcoming the above-mentioned difficulties and which will greatly facilitate, with a saving of both time and labor, the reconditioning of the shovel cutting edge.

A further object of the invention is to provide an attachment consisting of a replacement blade and which shall be capable of being readily applied to or removed from the bucket front edge.

A further object of the invention is to provide an attachment in accordance with the foregoing objects which attachment shall include individual tooth elements permanently attached thereto.

A still further object of the invention is to provide a device in accordance with the preceding objects in which the attachment will reinforce, stiffen and strengthen the bucket edge.

A still further purpose of the invention is to provide a replacement device in accordance with the above-mentioned objects which will embrace and receive both the bucket front edge and the front edge of the bucket side walls for obtaining the maximum strengthening effect upon the bucket and also for more securely attaching the replacement cutting edge upon the bucket.

A still further purpose of the invention is to provide a device in accordance with the preceding objects in which a relatively smaller number of fasteners shall be required for securely mounting the replacement blade upon the edge of a bucket together with means for protecting such fasteners against the heavy wear to which they would be subjected during the ordinary use of the bucket.

And a final important object of the invention to be specifically enumerated herein resides in the provision of a device in accordance with the foregoing objects in which the tooth elements of the replaceable bucket edge shall be so mounted as to additionally stiffen, strengthen and reinforce the replacement blade, and with the latter the front edge of the bucket itself.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the front portion of a conventional power-operated bucket showing the manner in which a preferred embodiment of the replacement blade assembly of this invention is detachably mounted thereon;

FIGURE 2 is a detail view taken upon an enlarged scale substantially upon the plane indicated by the section line 2—2 of FIGURE 1;

FIGURE 3 is a further detail view taken upon an enlarged scale substantially upon the plane indicated by the section line 3—3 of FIGURE 1 and showing in particular the mounting of the replacement blade assembly upon the front portion of the bottom of the bucket; and FIGURE 4 is a further detail view taken in horizontal section substantially upon the plane indicated by the section line 4—4 of FIGURE 3.

In the accompanying drawings there is shown a portion of a conventional bucket designated generally by the numeral 10 and to which the replacement bucket edge assembly indicated generally by the numeral 12 has been applied. The replacement edge or blade assembly in accordance with this invention is equally adaptable for use to provide a replacement cutting edge upon buckets, shovels or scoops of various types of power operated digging machinery. Consequently, the term bucket is employed hereinafter in this specification and claims in a generic sense to cover any implements of a bucket-like or scoop-like character and which have a front edge subjected to wear.

The bucket 10 includes a pair of generally perpendicular side walls 14 which at their lower edges are joined by a horizontal bottom wall 16 and which latter, as shown in FIGURE 3, is provided with a customary knife edge 18 at the open front end of the bucket.

As shown in FIGURES 1 and 3, the forward or vertically extending edges 19 of the bucket side walls 14 swing upwardly and backwardly from the front edge 18 and the horizontal plane containing the latter.

The replacement blade assembly 12 in accordance with this invention is of a generally U-shaped configuration including a transversely extending blade 20 having angularly disposed extremities 22 at its opposite ends which extend in parallel relation to each other substantially perpendicular to the blade 20 and also are inclined backwardly therefrom in accordance with the angle of the front edges 18 of the bucket side walls. Preferably the blade 20 and the extremities or end pieces 22 are integral with each other and are of the same onepiece construction. As shown best in FIGURE 3 it will be observed that the blade 20 of the blade assembly 12 includes plate-like upper and lower flanges 24 and 26 which at their front end are merged together to form a knife edge 28 for the blade. The flanges 24 and 26 are spaced from each other to provide a rearwardly opening pocket 30 therebetween which pocket is adapted to receive the front portion of the bottom wall 16 and the edge 18 of the bucket therein. It will be observed, therefore, that the blade provides a V-shaped body which is adapted to embracingly receive the front edge of the bucket therein both for attaching the device into the bucket and also for providing a renewed cutting edge therefor.

As a concomitant advantage of this invention, it will be observed that there are two additional thicknesses of metal applied to the top and bottom sides of the bottom wall 16 in the bucket at its edge 18 providing for a considerable reinforcing, strengthening and stiffening of this portion of the bucket which is liable to be excessively deteriorated through normal usage.

In a similar manner, the extremities or end pieces 22 of the blade assembly include as shown best in FIGURE 4 inner and outer flanges as at 32 and 34 which are disposed in spaced relation to each other to thus provide the rearwardly opening pocket 36 therebetween for receiving the front portion of the side walls of the bucket therebetween. Similarly, at their front ends the two flanges 32 and 34 are merged together to provide a cutting edge 38 which is positioned in front of the edge 19 of the side walls of the bucket.

The device is removably attached to the bucket by means of a pair of fasteners such as the bolts 39 which are secured through aligned apertures in the side pieces 22 and in the side walls 14, and by a single further fastener 40 which extends through the upper and lower flanges 24 and 26 and through a corresponding aperture in the bottom wall 16 of the bucket. A guard which may be in the form of an arcuately extending rib 42 is welded or otherwise secured to the top surface of the bottom wall 16 of the bucket as shown in FIGURES 1, 3 and 4 in close relation to the fastener 40 to protect the latter against undue wear during the use of the bucket.

The replacement blade assembly is further provided with a plurality of tooth elements including a pair of end tooth elements 44 and longitudinally spaced centrally disposed or intermediate tooth elements 46. The other two end elements are wider and are disposed closely adjacent to the end pieces or extremities 22 of the blade assembly. Each of the tooth elements is of a clip-like character comprising a V-shaped body having upper and lower plates, blades or flanges as at 48 which overlie corresponding lower members 50. As shown in FIGURE 3 it is preferred that the upper members shall extend further rearwardly than the lower member in order to more completely overlie the top surface of the flange 24 of the blade and to conform to the contour thereof. There is thus provided a V-shaped pocket as at 52 in the clips or teeth in order to receive the knife edge 28 of the replacement blade 20 therebetween. At its forward end, the upper flange 48 of the clip is secured as by welding 54 to the top surface of the lower flange 50 which latter projecting forwardly therefrom is beveled as at 56 to provide a chisel-like cutting edge. The rear ends of the flanges of the clip members are welded as at 58 and 60 to the top and bottom flanges 24 and 26 of the blade.

It will be observed that the provision of the tooth elements additionally serves to strengthen, straighten and reinforce the blade and with the latter the front portion of the bucket bottom wall.

When wear develops it is merely necessary to remove the three fasteners 39 or 40 whereupon the entire blade assembly 12 can be removed and replaced in a relatively short time.

It will, of course, be appreciated that various of the components of this assembly during the hereinbefore described may be individually omitted in certain instances and still obtain useful results from the remaining components of the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a forwardly opening bucket including upstanding side walls and a bottom wall connected to and extending transversely therebetween, a transversely extending forward cutting edge upon said bottom wall, cutting edges on said side walls extending upwardly and rearwardly from the ends of said forward cutting edge, a replacement blade assembly detachably mounted upon said bucket comprising a U-shaped body including a transversely elongated web with end pieces extending upwardly and rearwardly therefrom, said web and end pieces each having forwardly directed knife edges and a rearwardly opening pocket snugly and embracingly receiving the front portion of said bucket bottom and side walls, fasteners detachably securing said replacement blade assembly to said bucket side walls, a plurality of longitudinally spaced teeth secured to said web and projecting forwardly therefrom, each tooth comprising a V-shaped element including top and bottom members with a rearwardly opening space therebetween embracing the forward edge of said web, the bottom member having a knife edge at its forward end, said top member having its forward edge rigidly secured to said bottom member rearwardly of the bottom member forward edge, said web being secured to said bottom wall by a single removable fastener extending through both said bottom wall and web, and an arcuate rib-like guard bonded to and rising from the top surface of said web and at least partially encircling said removable fastener, said removable fastener being disposed rearwardly of a substantially centrally located tooth between the top member thereof and the guard.

2. The combination of claim 1 wherein the rearward edge of said top member terminates rearwardly of the bottom member rearward edge.

3. The combination of claim 1 wherein the endmost teeth are wider than the intermediate teeth.

4. The combination of claim 1 wherein said web and end pieces are integral, said teeth being welded to said web.

References Cited by the Examiner

UNITED STATES PATENTS

| | | | |
|---|---|---|---|
| 684,477 | 10/1901 | Thomas | 37—142 |
| 1,421,346 | 6/1922 | Seyms | 214—145 |
| 1,803,654 | 5/1931 | Ronk | 37—141 |
| 1,992,591 | 2/1935 | Whisler | 37—141 |
| 1,997,887 | 4/1935 | Prior | 37—142 |
| 2,164,988 | 7/1939 | De Baisi | 37—141 |
| 2,176,840 | 10/1939 | Hanks | 37—141 |
| 2,227,674 | 1/1941 | Ratkowski | 37—141 |
| 2,285,039 | 6/1942 | Lowe | 37—141 |
| 2,390,611 | 12/1945 | Nixon | 37—141 |
| 3,014,293 | 12/1961 | Boatman | 37—141 |

ABRAHAM G. STONE, *Primary Examiner.*

BENJAMIN HERSH, *Examiner.*

G. T. MOLLER, W. A. SMITH III,
*Assistant Examiners.*